United States Patent

[11] 3,527,150

[72] Inventors Michael S. Montalto
Rochester, New York;
Chester W. Michatek, Rochester, New York; William H. Horton, Rochester, New York
[21] Appl. No. 733,685
[22] Filed May 31, 1968
[45] Patented Sept. 8, 1970
[73] Assignee Eastman Kodak Company
Rochester, New York
a corporation of New Jersey

[54] FLASH CAMERA
10 Claims, 9 Drawing Figs.
[52] U.S. Cl............................................... 95/11,
240/37.1, 240/1.3
[51] Int. Cl.................................................. G03b 15/03
[50] Field of Search................................... 95/11,
11 (Lamp); 240/37.1, 1.3

[56] References Cited
UNITED STATES PATENTS
3,353,467 11/1967 Ernisse et al.................. 240/1.3
3,354,300 11/1967 Parsons et al................. 240/37.1

Primary Examiner—Norton Ansher
Assistant Examiner—Alan Mathews
Attorneys—Robert W. Hampton and William C. Dixon, III ABSTRACT: In a photographic flashcube camera, an automatic flashcube indexing mechanism having a flexible drive member for engaging and indexing a flashcube receiving socket. The flexible drive member is coupled to a slidable member that is moved in a first direction in response to the winding of film in the camera and in a second direction in response to shutter operation. The flexible drive member engages and indexes the flashlamp after shutter operation and upon movement of the slidable member in the second direction.

Patented Sept. 8, 1970

3,527,150

MICHAEL S. MONTALTO
CHESTER W. MICHATEK
WILLIAM H. HORTON
*INVENTORS*

BY *William C. Dixon, III*

*Robert W. Hampton*
ATTORNEYS

MICHAEL S. MONTALTO
CHESTER W. MICHATEK
WILLIAM H. HORTON
INVENTORS

BY

ATTORNEYS

MICHAEL S. MONTALTO
CHESTER W. MICHATEK
WILLIAM H. HORTON
INVENTORS

BY *William C. Orton*

*Robert W. Hampton*
ATTORNEYS

FLASH CAMERA

BACKGROUND OF THE INVENTION

1. Field of the Invention

This invention relates to flash photography, and more particularly to photographic still cameras with built-in photoflash systems for accepting multilamp photoflash packages such as flashcubes.

2. Description of the Prior Art

There has been developed a disposable multilamp photoflash unit or package having a plurality of photoflash lamps, as disclosed, for example, in U.S. Pat. No. 3,327,105. Cameras for receiving such a package, commonly known as a flashcube, and mechanisms for automatically indexing a received flashcube to successively place a fresh or unfired lamp in a flash-firing position also have been developed. In one such camera, as disclosed in U.S. Pat. No. 3,353,467, there is provided means for automatically indexing the flashcube by rotating the receiving socket after an exposure by a socket drive spring energized during the camera setting operation for such exposure.

SUMMARY OF THE INVENTION

The present invention comprises an improved flashcube socket drive mechanism that indexes the flashcube socket by means of a resilient drive member which is moved to a position of driving engagement with the socket during shutter cocking and which then rotates the socket after the camera shutter is released. In the preferred embodiment, the resilient drive member also acts as a detent to aid final positioning of the flashcube during the completion of each indexing movement.

The various objects and advantages of this invention will become apparent in the detailed description of the illustrated preferred embodiment appearing below, and the novel features thereof will be particularly pointed out in connection with the appended claims.

BRIEF DESCRIPTION OF THE DRAWINGS

In the preferred embodiment described below, reference is made to the accompanying drawings, in which.

DESCRIPTION OF THE PREFERRED EMBODIMENT

Figure 1:
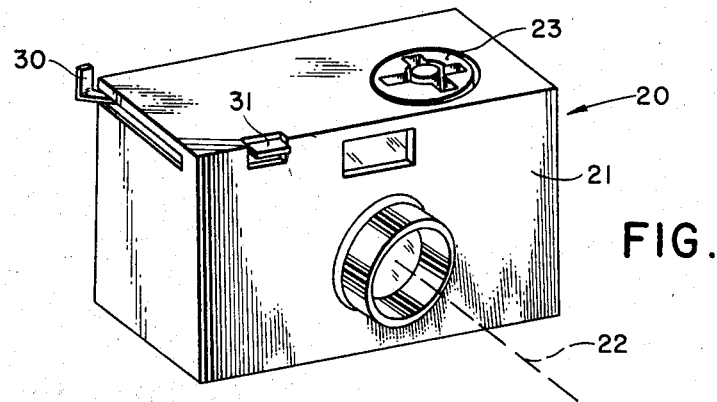
FIG. 1 is a perspective view of a photographic still camera embodying the present invention.

With reference to FIG. 1, there is shown a photographic roll-film still camera 20 comprising a light-tight camera body 21 having a picture-taking or lens axis 22 about which are located the usual objective focusing lens and film support for holding a roll of photosensitive film (not shown). The shutter cooperating with the present invention, to be described in more detail below, is positioned so as to be in operative relationship with the axis 22 in a manner known per se. Since photographic cameras are well known in the art, the present invention will be described only in relation to those elements forming part of the invention or in direct cooperation therewith, it being understood that the remaining camera components may be selected from those that are known.

Accessibly located at the top wall of camera body 21 is a multilamp-package-receiving socket 23 designed to receive a disposable, multilamp photoflash unit, or flashcube. Such a flashcube is more fully described in the aforementioned U.S. Pat. No. 3,327,105. Briefly, however, the flashcube includes a plurality (four) of photoflash lamps (AG-type) ordinately mounted in a vertical position about a vertical axis of rotation on a substantially square base, each lamp having a portion extending below the base to be selectively engageable with lamp firing means such as electrical terminals. An individual light reflector is positioned behind each lamp, and an overall, light-transmitting, protective cover is provided. The base defines four lamp sides and includes a depending center connecting post. The socket 23 defines an opening, corresponding to the shape of the connecting post, for receiving the package in any one of four predetermined positions in which one of the lamps is in position for engagement with the lamp firing means.

FILM-WINDING AND SHUTTER-ACTUATING MECHANISMS

To wind the roll film along the film plane for placing successive film frames in position for exposure, there is provided an accessible film winding lever 30 that is rotatable about a pivot 28. The lever 30 also sets the camera's shutter-operating mechanism, which is released by an accessible shutter-trigger or body-release member 31 to expose the positioned film frame by admitting light to the camera's interior along the axis 22 for a predetermined period.

Figure 2:
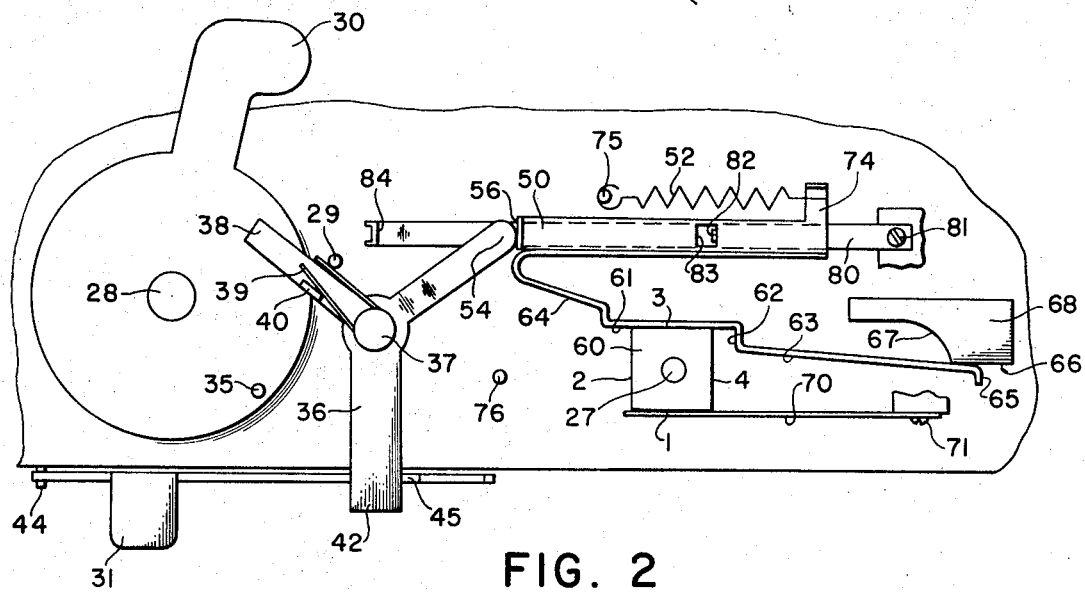
FIG. 2 is a top plan view showing the preferred embodiment of the flashcube socket indexing mechanism according to the present invention after the camera has been set.

Winding lever 30 operates a known film-winding mechanism (not shown) such as a pawl-and-ratchet assembly or clutch arrangement connecting the lever to a film-take-up spool. As shown in FIG. 2, winding lever 30 also includes a shutter-cocking pin 35 which acts to set the shutter mechanism as the film is being wound.

Figure 4:
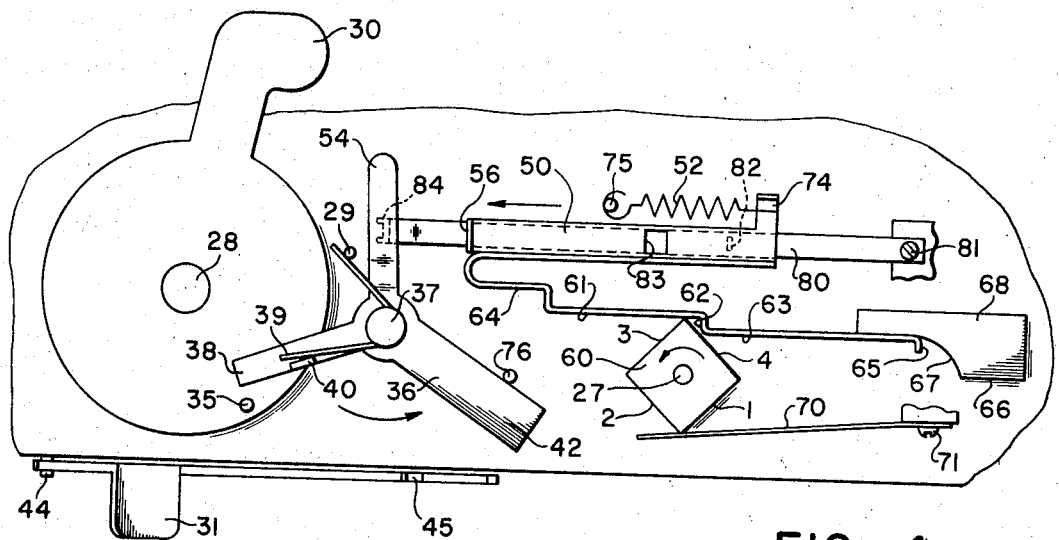
FIGS. 4 and 5 are top plan and front (partially broken away) views, respectively, showing the mechanism of FIGS. 2 and 3 as it appears after the camera trigger has been depressed and the flashcube socket has been rotated 45°.
Figure 5:
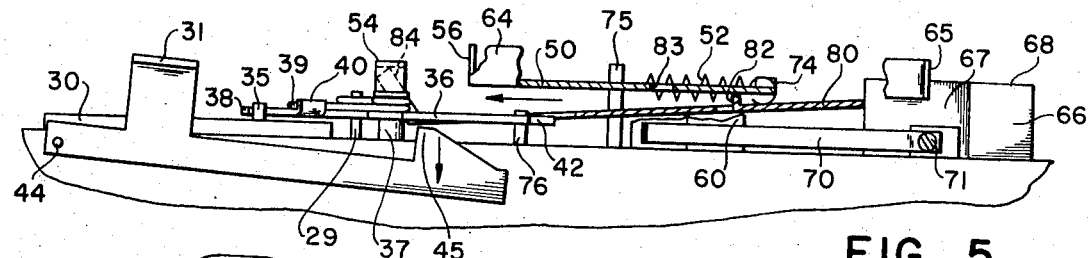
Figure 8:
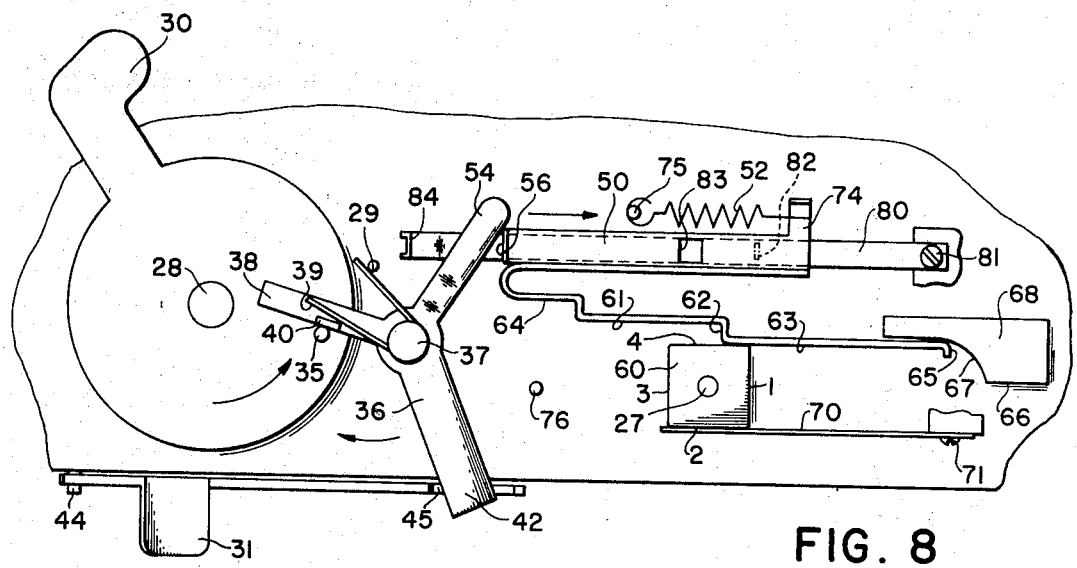
FIGS. 8 and 9 are top plan and front (partially broken away) views, respectively, showing the mechanism of FIGS. 2 and 3 as it appears when the camera is being reset and the indexing mechanism has been returned halfway to its cocked position.
Figure 9:
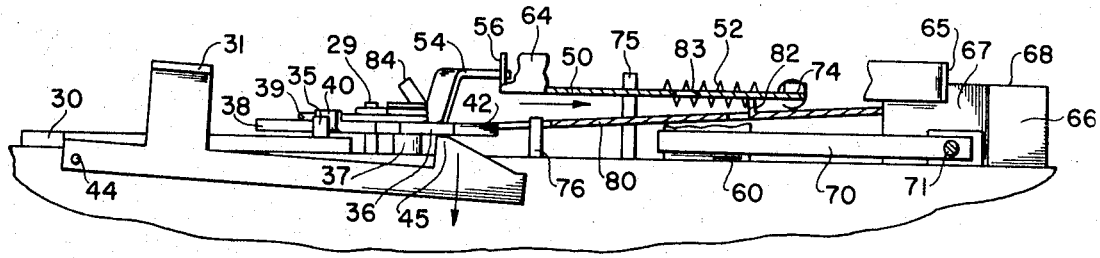

A suitable shutter mechanism according to the present invention comprises a shutter-striking plate or driver 36 which rotates about a pivot 37. An arm 38 on driver 36 is engaged by cocking pin 35, whenever winding lever 30 is operated, to move driver 36 clockwise, as shown in FIG. 8, against the bias of a strong spring 39 retained between tab 40 of arm 38 and pin 29 attached to camera body 21. The shutter itself comprises a pivotable impact shutter blade (not shown) having an ear in the path of a second arm 42 on driver 36. A weaker spring (not shown) normally holds the shutter blade in a position covering the exposure aperture, and a latch 45 on shutter-trigger member 31 is normally in the path of movement of arm 42 to prevent shutter operation until trigger member 31 is depressed. Upon release of cocked driver 36, by depressing trigger member 31 and thereby pivoting member 31 about pin 44 in a clockwise direction, as shown in FIG. 5, against a retaining spring (not shown), compressed spring 39 causes arm 42 of driver 36 to move to the right, as shown in FIG. 4, striking the ear of the shutter blade (not shown) and moving the shutter blade away from the exposure aperture against the bias of the shutter-blade spring (not shown) for the predetermined exposure period, the shutter blade subsequently returning to cover the aperture by operation of the shutter-blade spring.

According to the invention, the package-receiving socket 23, with an inserted flashcube, is automatically indexed to place a fresh lamp in its operative position after depression of trigger member 31 and consequent release of cocked driver 36. In the embodiment shown, a slider 50, slidably mounted on camera body 21, is biased to the left, as viewed in FIG. 4, by a slider return spring 52 secured at one end to extension 74 of slider 50 and at the other end to pin 75 attached to camera body 21. Slider 50 is energized, or set, as the shutter is cocked and the film is wound, by a third arm 54 on driver 36 engaging a tab 56 on slider 50 and moving slider 50 to the right, as shown in FIG. 8.

The socket drive mechanism further includes a square-shaped socket base 60 that is rotatable about a pivot 27 and forms the lower part of flashcube socket 23. Base 60 includes peripheral surfaces 1, 2, 3, and 4 which are successively engageable by surfaces 61, 62, and 63 of a resilient drive member 64 attached to slider 50. Surfaces 61, 62, and 63 together form an angular portion of the drive member 64 which, upon leftward movement of slider 50, engages an adjacent surface of socket base 60 to rotate base 60 in an indexing direction. Resilient drive member 64 also includes an end portion 65 which bears against cam surfaces 66 and 67 of a member 68, fixed to camera body 21, so as to maintain drive member 64 in resilient engagement with socket base 60.

Figure 6:
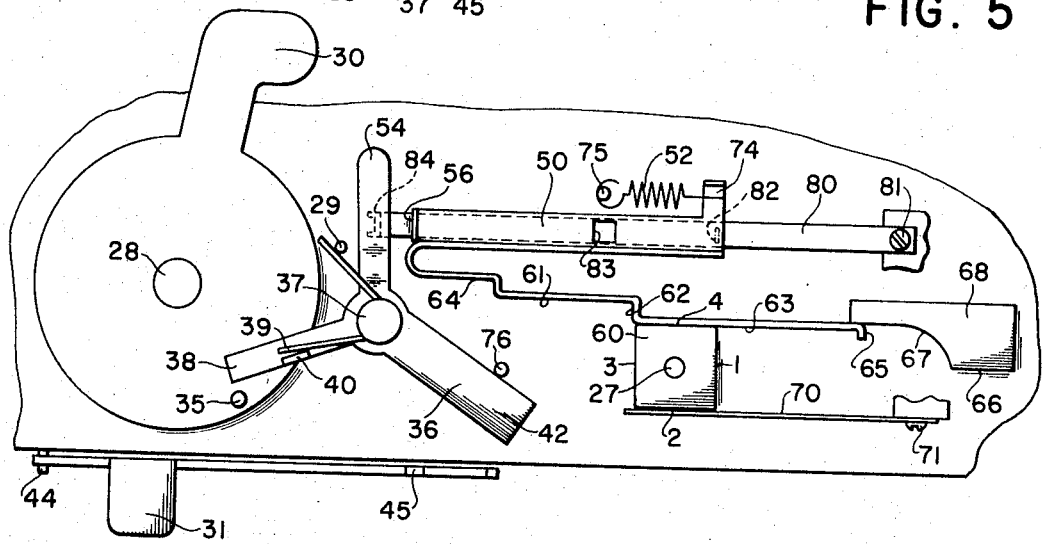
FIGS. 6 and 7 are top plan and front (partially broken away) views, respectively, showing the mechanism of FIGS. 2 and 3 as it appears after the flashcube socket has been rotated 90°.

As winding lever 30 is operated by moving it in a counterclockwise direction, as shown in FIG. 8, driver arm 54 engages tab 56 and moves slider 50 from its unenergized position, shown in FIG. 6, to its fully energized or set position, shown in FIG. 2. During this rightward movement of slider 50, as shown in FIG. 8, first surface 63 and then surface 61 of drive member 64 slide along the parallel surface of socket base 60 (surface 4 in FIG. 8), member 64 being maintained in its engaged position, as aforesaid, by the engagement of end portion 65 first with surface 67 and then with surface 66 of member 68.

Also successively engageable with surfaces 1, 2, 3, and 4 of socket base 60 is a resilient detent member 70, secured as by screw 71 to camera body 21, which serves to prevent clockwise rotation of base 60 during the above-described rightward movement of slider 50.

Figure 3:
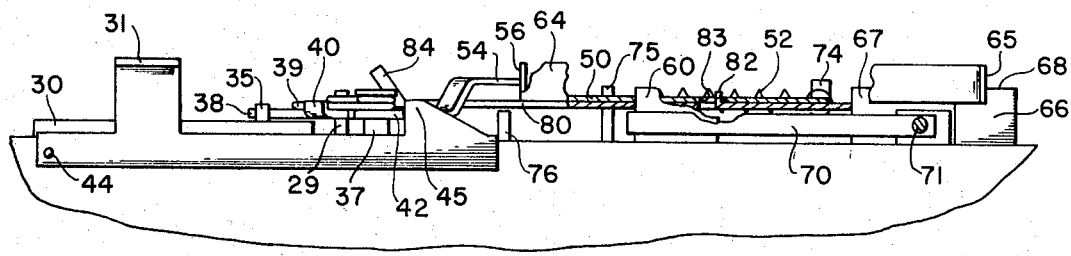
FIG. 3 is a front view, partially broken away, of the elements shown in FIG. 2.

To retain slider 50 against movement when driver 36 is in its cocked position, shown in FIG. 2, a resilient latch member 80, secured as by screw 81 to camera body 21 and biased upward as viewed in FIG. 3, is provided with a projection or tab 82 that is engageable with the underside of slider 50 and receivable in a recess or aperture 83 therein. To disengage tab 82 from aperture 83, and thereby permit movement of slider 50, member 80 is provided with an end portion 84 which projects upwardly at an angle as shown in FIG. 3. End portion 84 is engageable by the underside of arm 54 on driver 36 to depress member 80, and thereby withdraw tab 82 from aperture 83, upon counterclockwise rotation of driver 36, as best seen in FIGS. 4 and 5. Thus, slider 50 is unlatched for leftward movement whenever driver 36 is released from its cocked position.

Figure 7:
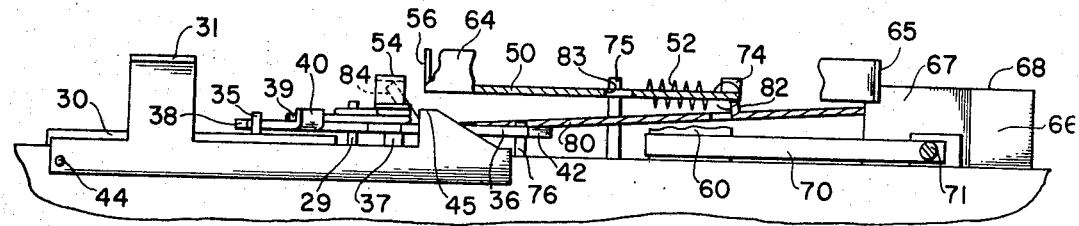

During camera operation, slider return spring 52 returns slider 50 from its energized or set position, shown in FIGS. 2 and 3, to its unenergized or released position, shown in FIGS. 6 and 7, thereby causing surface 62 of member 64 to move leftwardly to engage the adjacent surface of socket base 60 and rotate base 60 counterclockwise as shown in FIG. 4. As stated, shutter operation is controlled by a release latch 45 on trigger member 31, depression of which releases driver 36 to rotate counterclockwise, as shown in FIG. 4, thereby permitting slider 50 to move to the left by the urging of drive spring 52.

In an alternative embodiment (not shown) of the invention, slider return spring 52 could be eliminated by mechanically connecting slider 50 to arm 54 of driver 36 and utilizing the bidirectional motion of driver 36 to effect both the advancement and retraction of slider 50.

CAMERA OPERATION

To operate a photographic camera according to the preferred embodiment, a multilamp flash unit, or flashcube, is inserted in socket 23 with a fresh lamp in operative orientation. If an unexposed frame of film is not already in its exposure position with respect to lens axis 22, the film is advanced by moving film winding lever 30 counterclockwise from its position shown in FIG. 6 through its position shown in FIG. 8 to a stopped position (not shown), thereby advancing an unexposed film frame along the film plane and, at the same time, setting the camera shutter by cocking driver 36 through cocking pin 35. Simultaneously with film winding, socket indexing slider 50 is moved to the right, as illustrated in FIG. 8, against the bias of slider return spring 52, during which movement member 64 is held against socket base 60 by the engagement of end portion 65 with member 68, as previously described, and base 60 is prevented from rotating by the engagement of member 70 therewith, as also previously described.

At this point, winding lever 30 is permitted to return to its initial position, shown in FIGS. 2, 4, and 6, by a return spring (not shown), and the camera is ready for operation with augmenting flash.

When camera 20 has thus been set, resilient members 64 and 70 serve as a detenting means to aid the positioning of an inserted flashcube in operative orientation. Should the flashcube and socket be manually rotated in either direction of rotation, members 64 and 70 will become flexed by the force of the socket-base surfaces (surfaces 3 and 1. respectively, as seen in FIG. 2) bearing against them, and, up to approximately 15° of rotation, members 64 and 70 will return the socket to its normal, operative orientation.

Camera operation is accomplished by aiming the camera toward the subject to be photographed and depressing shutter-trigger member 31, in the downward direction of the arrow shown in FIG. 5, to its fully depressed position. This motion of member 31 releases cocked driver 36, arm 42 of which then rapidly strikes the aforementioned ear of the shutter blade (not shown) to cause the shutter blade to uncap the diaphragm aperture for the predetermined exposure time. Simultaneously, arm 42 may actuate a flash synchronizer to fire the positioned lamp in timed relationship with the uncapping of the exposure aperture to take the flash picture.

Also as cocked driver 36 is released, arm 54 thereof swings rapidly to the left, as viewed in FIGS. 2 and 4, thereby releasing slider 50 to move leftward, under the biasing influence of slider return spring 52, as indicated by the arrow shown in FIG. 4. Such motion of slider 50 causes surface 61 of member 64 to slide leftward along socket-base surface 3 (FIG. 2) until surface 62 engages surface 4 and then rotates socket base 60 counterclockwise, as shown in FIG. 4, the corner formed by surfaces 62 and 63 bearing against surface 4 (near the corner formed by surfaces 4 and 3) to complete the desired 90° of socket-base rotation before slider 50 reaches its leftmost, or unenergized, position shown in FIG. 6, in which position surface 63 then remains engaged with surface 4. During the final portion of this indexing movement of member 64, completion of the 90° socket-base rotation and positioning of the socket in its next lamp-firing orientation are aided by the detenting action of resilient members 64 and 70 upon socket base 60. FIGS. 6 and 7 show the several elements after they have come to rest in their released, or uncocked, positions, driver 36 having been stopped by pin 76 attached to camera body 21.

As can now be seen, by controlling all operations through a shutter driver having three arms, one of which cocks and releases a slider having a resilient member that effects socket rotation only upon release of the shutter driver, the invention ensures that the flashcube socket will always be indexed in correct relation with the remaining camera operating mechanisms while maintaining the advantage of having a preset socket orientation prior to exposure.

The invention has been described in detail with particular reference to a preferred embodiment thereof, but it will be understood that variations and modifications can be effected within the spirit and scope of the invention as described hereinabove and as defined in the appended claims.

We claim:
1. In a camera having a film-winding mechanism and a movable socket for receiving a multilamp flash device, the improvement comprising: a shutter driver movable between a set position and a released position, the shutter driver being coupled to the film-winding mechanism for movement to the set position in response to film winding, and drive means for mov- ing the socket to sequentially index successive lamps of a received flash device, the drive means including a slider movable in a first direction in response to film winding and in a second direction in response to movement of the shutter driver toward the released position, said slider including a resilient drive member engageable with the socket to move the socket and index the flashlamps in response to movement of the slider in the second direction.

2. The improvement claimed in claim 1 further comprising a camera operating member movable between a first position and a second position, the operating member engaging the shutter driver to retain the shutter driver in the set position when the operating member is in the first position, the operating member becoming disengaged from the shutter driver to permit movement of the shutter driver toward the released position when the operating member is moved toward the second position.

3. The improvement claimed in claim 1 wherein the resilient drive member engages an engagement surface of the socket in a detenting manner to facilitate the positioning of an inserted multilamp flash attachment in operative orientation.

4. The improvement claimed in claim 1 further comprising biasing means urging the slider in the second direction in response to movement of the shutter driver from the set position toward the released position.

5. The improvement claimed in claim 1 further comprising a resilient detent member engageable with an engagement surface of the socket to prevent movement of the socket in a direction opposite to the indexing direction upon movement of the slider in the first direction.

6. The improvement claimed in claim 1 further comprising camming means engageable with a portion of the resilient drive member to retain the resilient drive member in engagement with an engagement surface of the socket during movement of the slider.

7. The improvement claimed in claim 1 further comprising latch means engageable with the slider to retain the slider against movement when the shutter driver is in the set position and wherein the shutter driver includes a portion engageable with the latch means to disengage the latch means from the slider in response to movement of the shutter driver toward the released position.

8. The improvement claimed in claim 7 wherein the latch means includes a resilient member having a projecttion engageable with projection receiving means in the slider when the shutter driver is in the set position and also having a portion engageable by the shutter driver upon movement of the shutter driver toward the released position to disengage the projection from the projection receiving means.

9. The improvement claimed in claim 1 wherein the resilient drive member includes an angular portion that is engageable with an engagement surface of the socket to rotate the socket in the indexing direction upon movement of the slider in the second direction.

10 The improvement claimed in claim 9 wherein the plurality of engagement surfaces on the socket comprises four sides of a substantially square-shaped socket base and wherein the angular portion of the resilient drive member engages a corner portion of the square-shaped socket base to rotate the socket approximately 90° in the indexing direction upon movement of the slider in the second direction.